United States Patent [19]

Müller

[11] 4,439,327
[45] Mar. 27, 1984

[54] BACKWASH MULTIPLE ALLUVIAL FILTER AND METHOD OF FILTERING THEREWITH

[75] Inventor: Hans Müller, Erlenbach, Switzerland

[73] Assignee: Dr. Muller AG, Maennedorf, Switzerland

[21] Appl. No.: 393,361

[22] Filed: Jun. 29, 1982

[30] Foreign Application Priority Data

Jul. 16, 1981 [CH] Switzerland ............... 4653/81

[51] Int. Cl.³ .................. B01D 35/12; B01D 29/24; B01D 29/38
[52] U.S. Cl. .................................. 210/772; 210/791; 210/323.2; 210/333.1; 210/108
[58] Field of Search ............. 210/797, 798, 333.01, 210/341, 333.1, 340, 123, 411, 323.2, 409, 410, 341, 772, 323.1, 108, 335, 791

[56] References Cited

U.S. PATENT DOCUMENTS

| | | | |
|---|---|---|---|
| 2,391,716 | 12/1945 | Koupal | 210/333.1 |
| 2,748,077 | 5/1956 | Hodan et al. | 210/258 |
| 3,682,306 | 8/1972 | Gaudfrin | 210/333.1 |
| 4,088,579 | 5/1978 | Kocsanyi et al. | 210/411 |
| 4,162,973 | 7/1979 | Lynch | 210/341 |

*Primary Examiner*—Charles N. Hart
*Assistant Examiner*—John W. Czaja
*Attorney, Agent, or Firm*—Michael J. Striker

[57] ABSTRACT

A backwashing alluvial filter has a vertical filter container, a plurality of collecting pipes removably mounted in the container, a plurality of filter elements suspended on the collecting pipes, separating walls subdividing the interior of the filter container into at least two chambers, and communicating with one another via vertical overflow shafts. Washing off of solid matter is performed by supplying a washing liquid via pipes directly under the overflow shafts.

15 Claims, 3 Drawing Figures

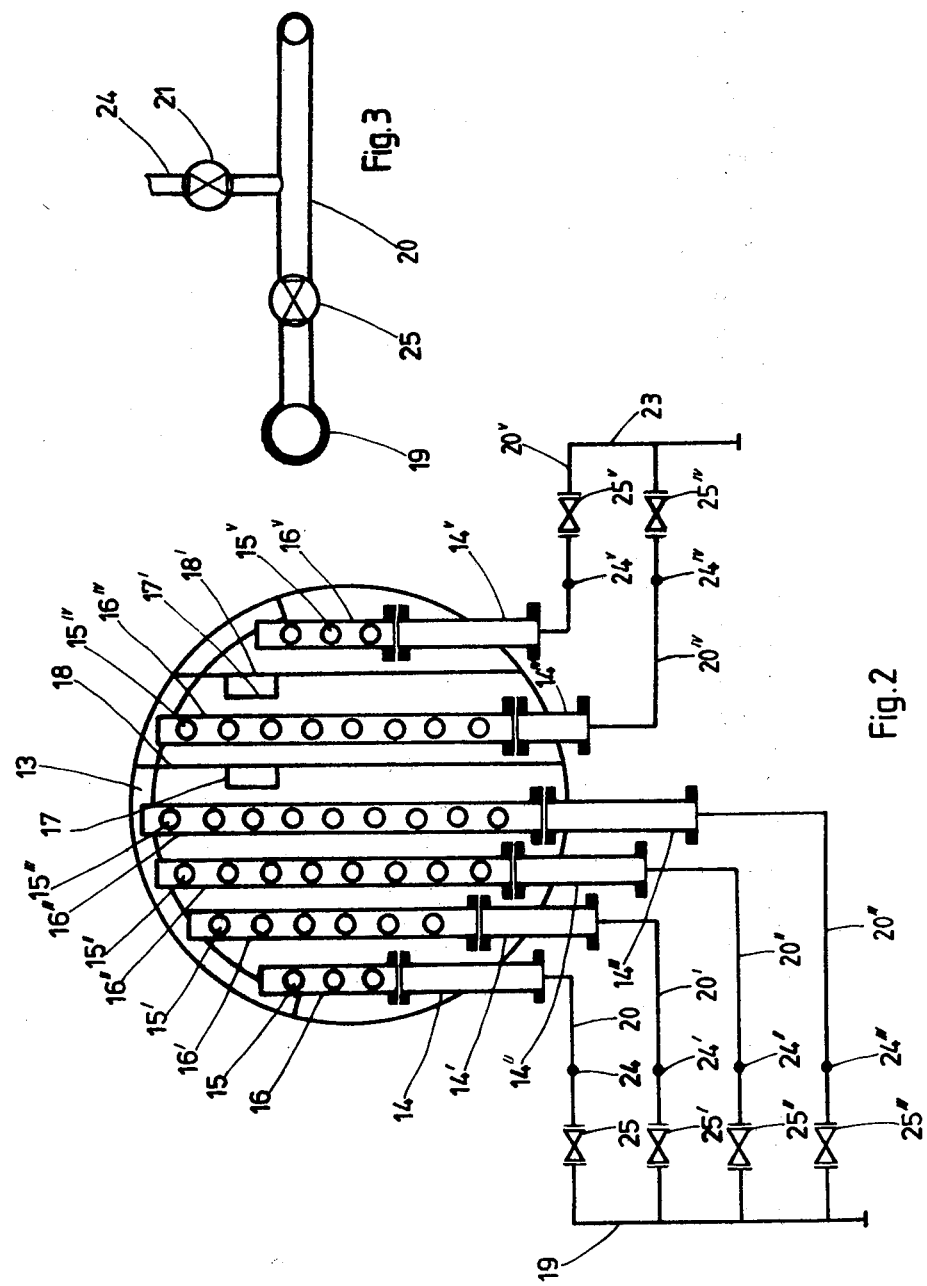

BACKWASH MULTIPLE ALLUVIAL FILTER AND METHOD OF FILTERING THEREWITH

BACKGROUND OF THE INVENTION

The present invention relates to a backwash alluvial filter with a plurality of filter elements, as well as to its utilization for washing out solid matter.

Filters for fluids are known, comprising filtering elements which are composed of suspended candles and removable in rows. One of such filters is disclosed, for example, in the German Offenlegungsschrift No. 2,741,639. This filter has a filter container with a collecting pipe located in the interior of the container and mounting a plurality of suspended filter elements arranged one behind the other. The collecting pipes are located adjacent to one another on supporting bodies and can be removed from the filter container by rows.

The Austrian Pat. No. 211,329 shows a device for backwashing of filter candles arranged in rows and mounted on the collecting conduit in standing position. The collecting conduits extend at both sides horizontally through the container wall. The arrangement at both sides is very expensive. In addition, each collecting conduit is provided with two locking elements for the plurality of tank openings and require a plurality of valves and armatures.

In all methods and arrangements the outlet valves for the clarified filtrate must be switched to backwash mode during the backwashing. This means that a clarified filtrate cannot be recovered during the entire backwashing operation.

SUMMARY OF THE INVENTION

Accordingly, it is an object of the present invention to provide a backwash alluvial filter and a method of filtering which avoid the disadvantages of the prior art.

More particularly, it is an object of the present invention to provide a backwash alluvial filter and a method of filtering which allows washing off of solid matter with washing fluid without interruption of withdrawal of a clarified filtrate.

In keeping with these objects and with others which will become apparent hereinafter, one feature of the present invention resides, briefly stated, in a backwash alluvial filter with a plurality of filter elements, and a method of filtering, in accordance with which a filter container is subdivided into at least two chambers which communicate with one another by vertical overflow shafts. It is another advantageous feature of the present invention that a washing fluid is supplied via pipes directly under the overflow shaft.

In accordance with still another feature of the present invention, the overflow shafts are formed by separating walls. One of the separating walls which faces toward a pulp inlet is spaced by a predetermined distance from a container bottom and extends with its outer part above a fluid level in a gas chamber.

The other separating wall is mounted on the bottom of the container and forms with its upper part an overflow weir. The washing fluid together with solid matter removed from the filter elements is supplied via a guiding shaft into the shafts from below upwardly, it is washed and supplied via the overflow weir into a further filter chamber. This process can be repeated many times.

Still a further feature of the present invention is that the fluid level above the filter elements is adjusted by the gas pressure in a head part of the filter container with the aid of a lever controlling element. An outlet valve is controlled automatically, whereas the backwashing of the filter candles is peformed separately in rows.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a horizontal section of the filter of FIG. 1; and

FIG. 3 is a view showing a part of a backwashing device.

DESCRIPTION OF A PREFERRED EMBODIMENT

Figure 1:
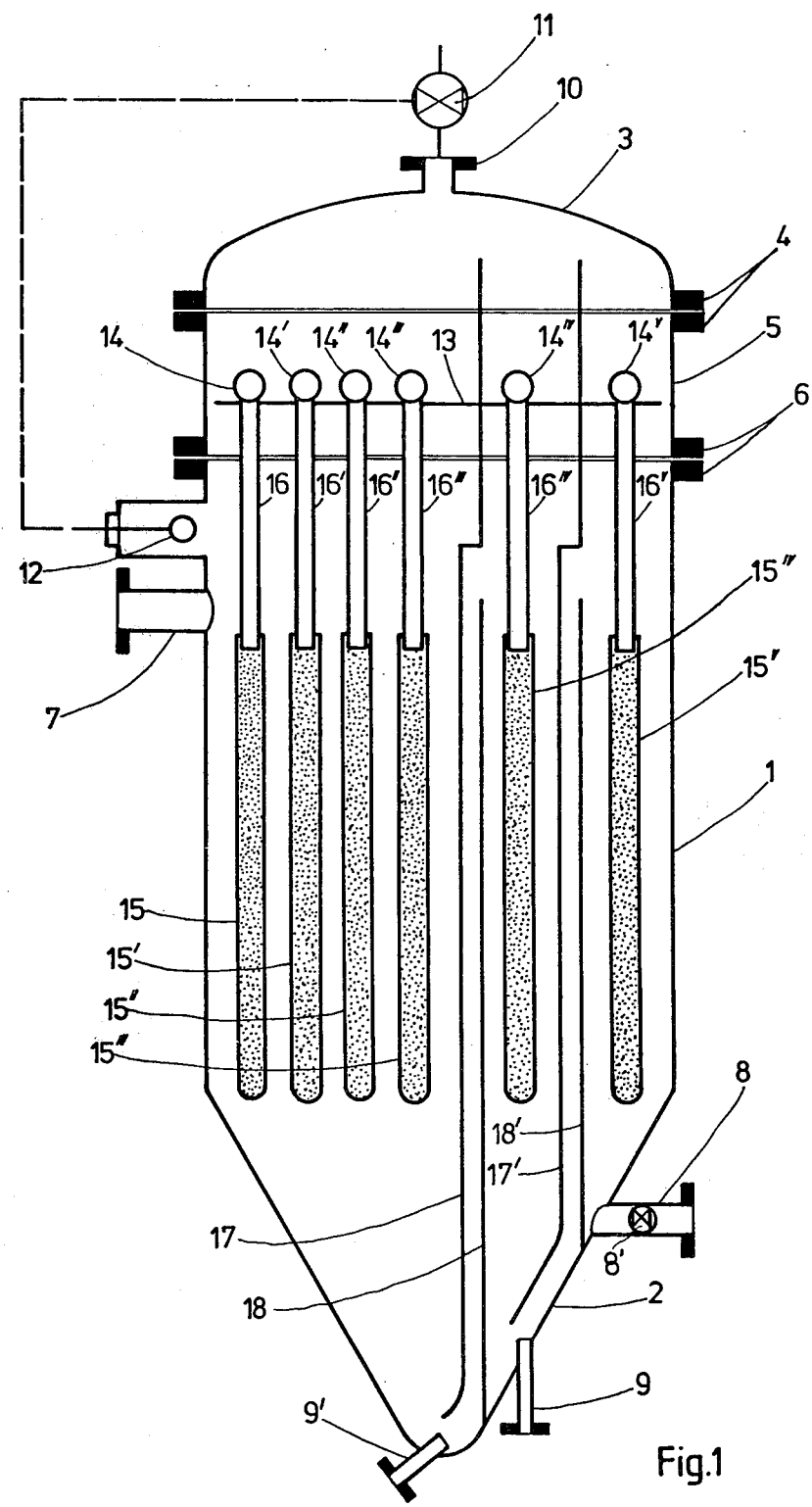
FIG. 1 is a view showing a vertical section of a filter in accordance with the present invention.

A backwashing alluvial filter with a plurality of filter elements has a filter container which includes a cylinder 1 with a conical bottom 2 and a cover 3.

The cover 3 is connected by a pair of flanges 4 with an intermediate cylindrical part 5. The intermediate cylindrical part 5 is connected, in turn, with the cylinder 1 by a pair of flanges 6. The cylinder 1 has a supply pipe 7 for a material to be filtered such as a pulp, and a outlet pipe 8 provided with an outlet valve 8' for a filtered material, such as cleaned solid matter suspension. Pipes 9 and 9' are provided for washing fluid and/or gas supply.

A pipe 10 for gas supply or withdrawal is provided in the cover 3 of the filter container. A control valve 11 is controlled via a level controlling element 12.

A circular ring 13 is arranged inside the filter container. A plurality of collecting pipes, for example collecting pipes 14, 14', 14'', 14''', $14^{IV}$, $14^V$ are mounted on the circular ring 13. The number of the collecting pipes depends upon the available space in the container and the desirable filter surface. Filter elements 15, 15', 15'', 15''', $15^{IV}$ and $15^V$ are mounted on pipes 16, 16', 16'', 16''', $16^{IV}$ and $16^V$.

Separating walls are further provided in the interior of the filter container. A separating wall 17 is open in a lower part of the conical bottom 2 toward the pulp side. A second separating wall 18 is connected with the bottom 2 and forms in upper part an overflow weir. Further separating walls form washing chambers. One of the washing chambers is provided between the separating walls 18 and 17', whereas the other washing chamber is formed between the separating wall 18' and the wall of the container. Collecting pipes $14^{IV}$ and $14^V$ are mounted on intermediate elements $16^{IV}$ and $16^V$ in the washing chambers, respectively. Several rows of the connecting pipes may be provided in each washing chamber.

FIG. 2 is a horizontal section of the inventive filter at the height of the filter elements 15. Conduits 24, 24', 24'', 24''', $24'^V$, $24^V$ open in branching conduits 20, 20', 20'', 20''', $20'^V$, $20^V$ and are provided with valves 21. Check valves 25, 25', 25'', 25''', $25^{IV}$, $25^V$ are arranged at the end of the branching conduits 20 and lead to a collecting conduit 19 for withdrawing a clarified filtrate. The collecting pipe $14'^V$ in the first washing chamber leads to the conduit $20'^V$, valve $21'^V$ and the washing conduit $24'^V$, the check valve $25'^V$ and a conduit 23. Similarly, the conduit $20^V$ leads from the second washing chamber from the collecting pipe $14^V$ via the valve $25^V$ and the washing conduit $24^V$ with the valve $21^V$ to the conduit 23.

The backwash alluvial filter with a plurality of filter elements in accordance with the present invention operate in the following manner: A pulp is supplied via the inlet pipe 7 into the filter container. The solid matter deposits on the fabric of the filter elements 15 where it forms a solid cake. The liquid removed from the solid matter flows via the pipe 16 and the collecting pipe 14 as filtrate out of the filter container. As soon as the filter cake reaches a predetermined thickness, a process of removing the filter cake takes place. The individual rows of the filter elements mounted on the collecting pipe 14 are successively released from filter cake with gas or liquid countercurrent fluid by closing one of the clarifate check valves 25 and opening one of the valves 21 in the washing fluid conduit 24. The removed filter cake falls into the conical bottom 2 of the filter container. The row 16 of the filter elements 15 released from cake is free for further filtration, and a further row, for example the row 16' can be released from the filter cake in the same manner. The sunk solid matter can be displaced via the pipe 9' with washing fluid under pressure and thereby supplied into the first washing chamber in which it deposits on the filter elements $15^{IV}$. Then it is again removed by closing of the valve $25^{IV}$ and opening of the valve 21 in the conduit $24^{IV}$ and supplied into a second washing chamber in the above-described manner. The washing step can be repeated as often as possible, depending upon the number of the washing chambers. The washed solid matter is withdrawn via the pipe 8.

The above-described method and arrangement is particularly suitable for washing of solid matter. As an example it can be used for releasing red pulp from caustic soda. It also can be utilized for salt water purification before and after the electrolysis. It can be utilized for spinning baths in the process of manufacturing of viscous and separation of condensate, PVC waste water and filtration of thin juice during production of sugar.

It will be understood that each of the elements described above, or two or more together, may also find a useful application in other types of constructions differing from the types described above.

While the invention has been illustrated and described as embodied in a backwashing alluvial filter with multiple filter elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims.

I claim:

1. A backwashing multiple alluvial filter, comprising a vertical filter container having a bottom; inlet and outlet means in said container; a plurality of collecting pipes removably mounted in said container; a plurality of rows of filter elements suspended on said collecting pipes; means for subdividing the interior of said filter container into at least two vertical chambers connected with one another by narrow vertical overflow shafts and each accommodating at least one of said rows of filter elements; and said subdividing means including separating walls which have different heights and some of which are spaced from said bottom so as to form said overflow shafts.

2. A filter as defined in claim 1, wherein said filter container has a predetermined liquid level, some of said separating walls exceeding the liquid level in said filter container.

3. A filter as defined in claim 1; and further comprising means for displacing a washing liquid from one to the other chamber and including pipes arranged directly under said overflow shafts.

4. A filter as defined in claim 1; and further comprising means forming a gas cushion above said filter elements.

5. A filter as defined in claim 4; and further comprising a level controlling element arranged so that gas pressure of the gas cushion is adjusted via said level controlling element.

6. A filter as defined in claim 1, wherein said outlet means including an outlet pipe for filtered material and an outlet valve provided in said outlet pipe.

7. A filter as defined in claim 1; and further comprising means for backwashing said filter elements in rows separately from each other.

8. A method of filtering in a backwashing multiple alluvial filter, comprising the steps of providing a vertical filter container with inlet and outlet means, a plurality of collecting pipes removably mounted in the container and a plurality of rows of filter elements suspended on the collecting pipes; subdividing the interior of the filter container into at least two vertical chambers connected with one another by narrow vertical overflow shafts and each accommodating at least one of said rows of filter elements; removing a filter cake deposited on the filter elements in one of the chambers by supplying a washing liquid to reverse the flow through the filter elements; and passing the filter cake and washing liquid from the bottom of the container through the shaft into the top of the other chamber.

9. A method as defined in claim 8; and further comprising the steps of displacing a washing liquid from one to the other chamber via pipes directly under the overflow shafts.

10. A method as defined in claim 8; and further comprising the step of forming a gas cushion above the filter elements.

11. A method as defined in claim 10; and further comprising the step of adjusting a gas pressure of the gas cushion via a level controlling element.

12. A method as defined in claim 8; and further comprising the step controlling an outlet valve provided in an outlet pipe for filtered material.

13. A method as defined in claim 8; and further comprising the step of backwashing the filter elements in rows separately of each other.

14. A backwashing multiple alluvial filter, comprising a vertical filter container having a bottom and a top; inlet and outlet means in said container;
a plurality of collecting pipes removably mounted in said container;

a plurality of rows of filter elements vertically suspended on said collecting pipes; and means for subdividing the interior of said filter container into at least two vertical chambers which are connected with one another by narrow vertical overflow shafts and each accommodate at least one row of said filter elements, said subdividing means including at least a pair of separating walls arranged so that one of said separating walls is located at a distance from said bottom and is higher than the other of said separating walls.

15. A filter as defined in claim 14, wherein said walls are spaced from said top of said container.